Oct. 5, 1965    J. A. C. KENTFIELD    3,209,986
PRESSURE EXCHANGERS

Filed May 13, 1963    4 Sheets-Sheet 1

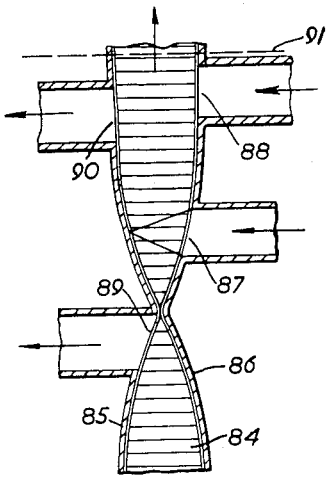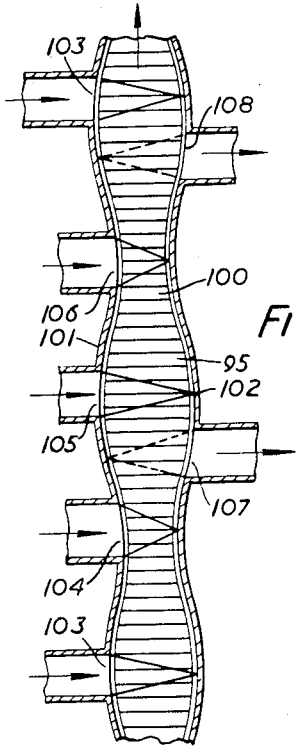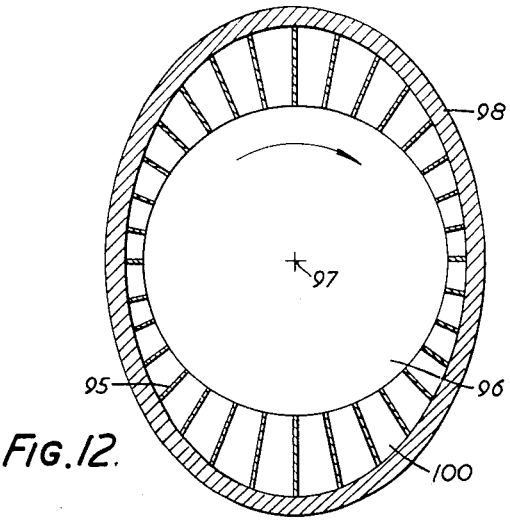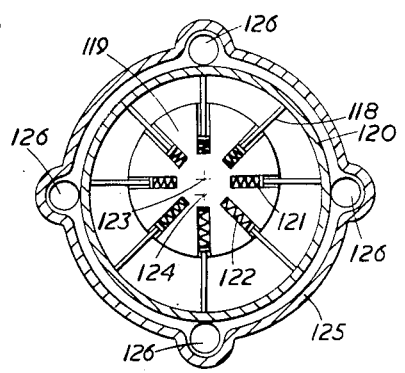

United States Patent Office 3,209,986
Patented Oct. 5, 1965

3,209,986
PRESSURE EXCHANGERS
John A. C. Kentfield, Worthing, Sussex, England, assignor to Power Jets (Research & Development) Limited, London, England, a British company
Filed May 13, 1963, Ser. No. 280,054
Claims priority, application Great Britain, May 2, 1961, 15,858
17 Claims. (Cl. 230—69)

This invention relates to pressure exchangers and is a continuation-in-part of application Serial No. 187,500, filed April 16, 1962, and now abandoned.

The term "pressure exchanger" is used herein to mean apparatus comprising cells in which one gas quantity expands, so compressing another gas quantity with which it is in direct contact, ducting to lead gas at different pressures steadily to and from the cells and means to effect relative motion between the cells and the ducting. The cells are usually arranged around a cell rotor in the form of a ring.

In previously proposed pressure exchangers, the cells have been of constant volume. Owing mainly to the constant volume of the cells, cycle pressure ratios have been limited unless complicated cycles or compounded machines were adopted.

Furthermore, the direct production of shaft power is difficult in a pressure exchanger having cells of constant volume without the incorporation in the cycle of a suitable turbine either as a separate component or constructed integrally with the pressure exchanger cell ring.

Conversely, if it is desired to supply shaft power to the pressure exchanger, it is not possible to convert the shaft power potential into gas energy in a pressure exchanger having cells of constant volume without the utilization of a suitable compressor in the cycle either as a separate component or constructed integrally with the pressure exchanger cell ring.

It is an object of the present invention to provide a pressure exchanger which includes cells of variable volume and means for varying the volume of the cells on relative motion between the cells and the ducting.

At a position of minimum volume, the volume of the cells may be substantially zero.

The variation in cell volume may be produced by eccentrically mounting the cell ring in relation to structure circumferentially surrounding the cell ring which cell ring has radially slidable cell walls.

In the accompanying diagrammatic drawings,

FIGURE 1 is an exploded perspective view of a conventional pressure exchanger; and FIGURE 2 is a developed view of a conventional pressure exchanger.

Embodiments of the invention will be described by way of example, with reference to the following accompanying diagrammatic drawings, in which.

Figure 8:
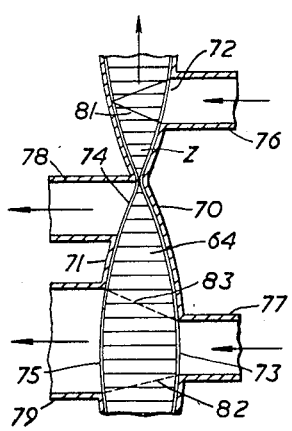
FIGURE 8 is a developed view of an alternative pressure exchanger in accordance with the invention.
Figure 9:
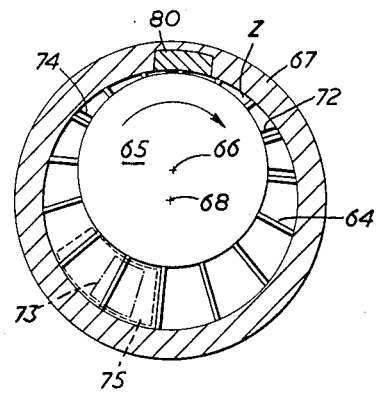

FIGURE 9 diagrammatically illustrates the variation in volume of the cells of the cell ring of the pressure exchanger shown in FIGURE 8;

FIGURE 10 is a further developed view of a pressure exchanger in accordance with the invention;

FIGURE 11 is a developed view of a still further pressure exchanger in accordance with the invention;

FIGURE 12 diagrammatically illustrates the variation in volume of the cells of the cell ring of the pressure exchanger shown in FIGURE 11.

Figure 13:
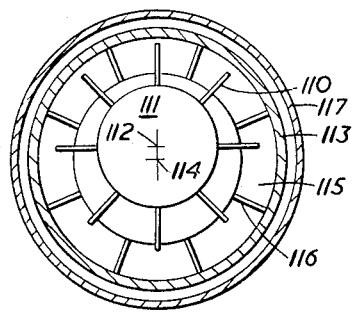
Figure 13A:
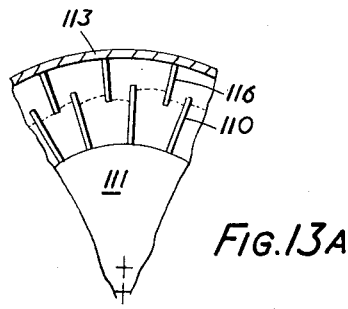
Figure 15:
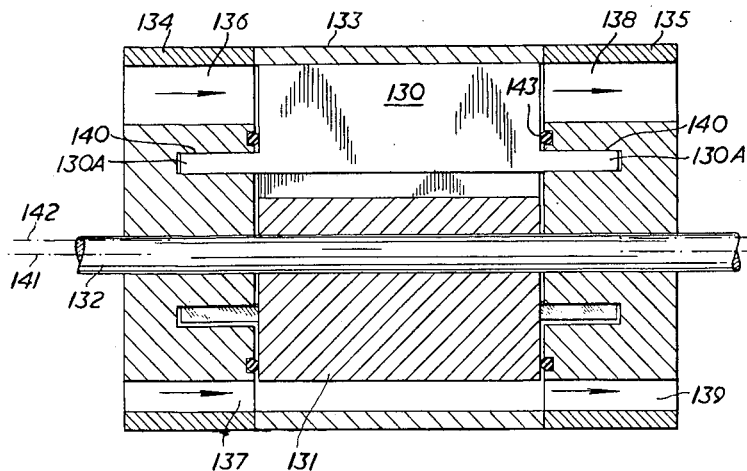
Figure 16:
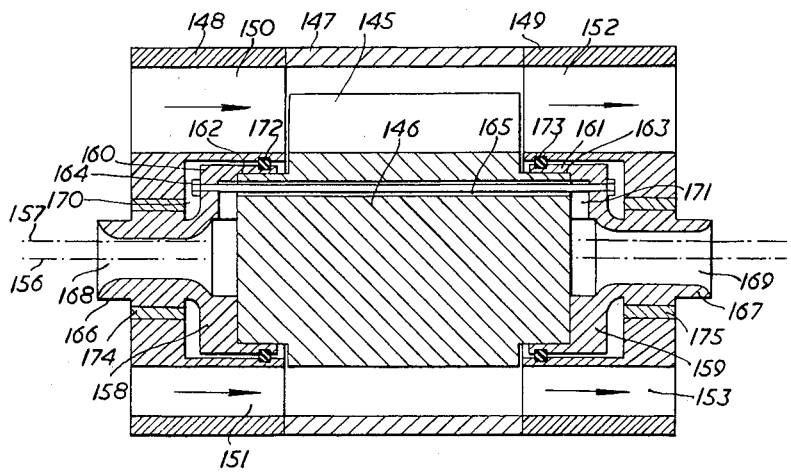

FIGURE 13 shows a pressure exchanger cell ring having hydrodynamic means for varying the volume of the cells;

FIGURE 13A is an enlarged view of a part of the pressure exchanger shown in FIGURE 13; and FIGURES 14, 15 and 16 show pressure exchanger cell rings having radially outwardly slidable cell walls.

Figure 1:
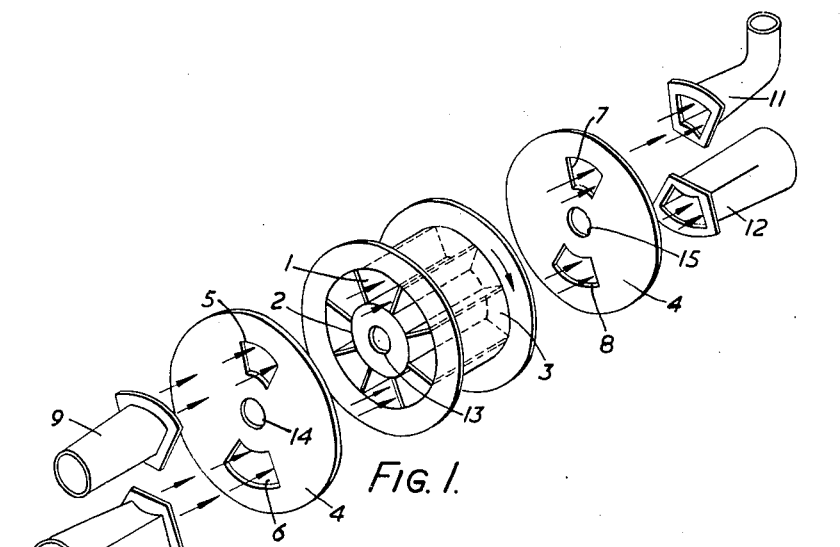
Figure 2:
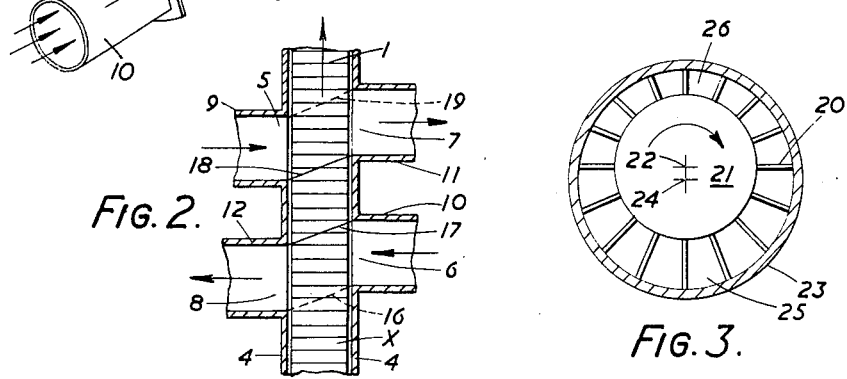

Referring to FIGURES 1 and 2, the pressure exchanger includes a cell ring having a multiplicity of radial walls 1 arranged around a cell rotor 2 and having a cylindrical shroud 3. The cells defined by the walls 1, the cell rotor 2 and the shroud 3 are in themselves open-ended but the effective opening of the ends of the cells is controlled by end-plates 4 having ports 5, 6, 7 and 8 to lead fluid to and from the cells. In the example shown, high-pressure fluid is admitted through the port 5, low-pressure fluid is admitted through the port 6, high-pressure fluid leaves through the port 7 and low-pressure fluid leaves through the port 8. Ducts corresponding to these ports are referenced 9, 10, 11 and 12 respectively. The ports and ducts illustrated in this figure have been made of smaller circumferential extent than would be used in practice. A shaft (not shown) passes through bores 13, 14, 15 in the hub 2 and end-plates 4.

In operation, the cells 1 of the cell ring are continuously moving past the ports and the lands between the ports. Thus, the cycle for the purpose of description may be considered to start at any position.

Assuming that the cycle starts at a position X (FIGURE 2), gas trapped in the cell passing the position X will be stationary relative to the cell structure and both ends of that cell will be closed by the end-plates 4. The gas is introduced to the cell in a manner to be described hereinafter. As this cell continues to rotate, its left-hand end (as shown in the drawing) is opened to the low-pressure scavenging stage outlet port 8, which communicates with the outlet duct 12. The stagnation pressure of the gas in the duct 12 is lower than the initial stagnation pressure within the cell. Consequently, a series of expansion waves of small amplitude, shown diagrammatically at 16, will start to pass through the cell as the gas in the cell leaves through the port 8, and will create a low-pressure region at the right-hand end of the cell. As the cell ring continues to rotate, the cell is opened to the low-pressure scavenging stage inlet port 6 which forms a termination of the inlet duct 10. Since the pressure in the cell is lower than total pressure in the inlet duct 10, air will flow through the port 6 into the cell as the gas in the cell is expelled through the port 8. As soon as the left-hand end of the cell is closed by the end-plate, a series of compression waves, diagrammatically indicated at 17, will pass through the cell.

As the cell ring continues to rotate, the cell is again closed at both ends by the end-plates 4, until the cell opens at its left-hand end to the high-pressure scavenging stage inlet port 5 which forms a termination of the inlet duct 9. The gas in the duct 9 is at a higher pressure than the air in the cells, consequently, a series of compression waves, diagrammatically shown at 18, passes through the cell, thus compressing the contents of the cell. As the cell ring continues to rotate, the cell is opened to the high-pressure scavenging stage outlet port 7, through which the contents of the cell are exhausted to the outlet duct 11. As soon as the left-hand end of the cell is closed by the end-plate, a series of expansion waves, shown diagrammatically at 19, passes through the cell. As the cell ring continues to rotate the cell reaches the position X, after which the cycle of operation is continuously repeated.

Figure 3:
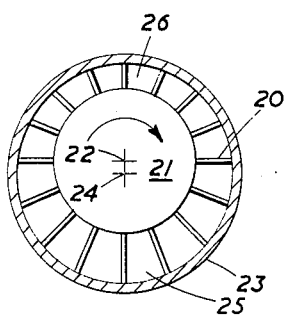
FIGURE 3 illustrates the variation in volume of the cells of a cell ring of a pressure exchanger in accordance with the invention.

FIGURE 3 diagrammatically illustrates the manner in which the volume of the cells of a pressure exchanger is varied in accordance with the present invention. The pressure exchanger includes a cell ring having a multiplicity of radial walls 20 arranged around an inner member in the form of a cell rotor 21. The cell ring has an axis of rotation 22. An outer tubular stationary shroud member 23 having an axis 24 circumferentially surrounds the cell ring. As can be understood from the drawings, on rotation of the cell ring in a clockwise direction, the cells progressively decrease in volume from a position of maximum volume 25 until they reach a position of minimum volume 26. On continued rotation, the cells progressively increase in volume until they again reach the position 25.

The volume of the cells may be made to vary by several methods, some of which will be described hereinafter.

Figure 4:
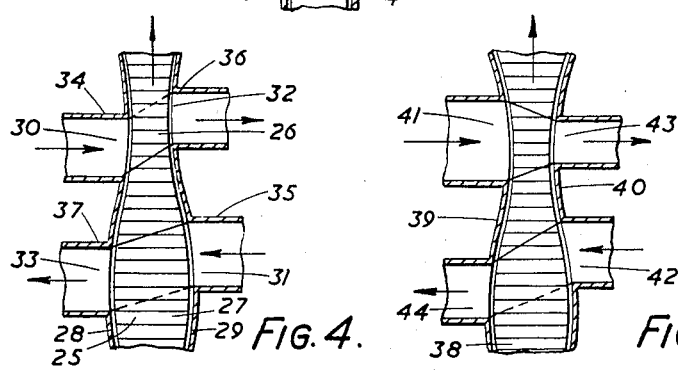
FIGURE 4 is a developed view of the pressure exchanger illustrated in FIGURE 3, in which radial variation of the volume of the cells of the pressure exchanger has been indicated by axial variation in the length of the cell walls.

FIGURE 4 is a developed view of the pressure exchanger described with reference to FIGURE 3 in which radial variation of the volume of the cells has been indicated diagrammatically for clarity of explanation by axial variation in the length of the cell walls. The pressure exchanger has cells 27 of variable volume and end-plates 28, 29 at each end of the cells, in which end-plates there are ports 30, 31, 32 and 33 to lead fluid to and from the cells. High-pressure fluid is admitted to the cells through the port 30, low-pressure fluid is admitted to the cells through the port 31, high-pressure fluid leaves the cells through the port 32 and low-pressure fluid leaves the cells through the port 33. Ducts corresponding to these ports are referenced 34, 35, 36 and 37. The operation of this pressure exchanger will be the same as that described in accordance with FIGURES 1 and 2, except that the fluid in the cells after the position 25 will be compressed progressively by the reduction in volume of the cells up to the position 26 after which the fluid left in the cells will be expanded progressively by the increasing volume of the cells up to the position 25. It will therefore be appreciated that higher compression ratios of the fluid will be achieved at the high-pressure scavenging stage by using cells of variable volume than by using a conventional pressure exchanger with cells of constant volume. This cycle is therefore particularly suitable for use as a supercharger. Furthermore, although not primarily intended as a cycle for the production of shaft work, owing to the losses incurred during the high-pressure scavenging process, this supercharger cycle will have higher pressures in the expansion region than in the corresponding position in the compression region, which implies that a certain amount of nett positive gas work is obtained. This available work may be used, for example, as a means to provide rotation of the cell ring relative to the end-plates and so reduce or eliminate the shaft power input necessary to rotate the cell ring.

In an alternative embodiment to that described in accordance with FIGURE 4, the pressure exchanger may be operated as either a shaft power producer or a compressor. In this alternative embodiment the duct 36 communicates with the inlet of a heat-input means, for example a combustion chamber, the outlet of which communicates with the duct 34 to lead high-pressure fluid to the cells. Part of the fluid passing through either the duct 36 or the duct 34 can be bled off for some external use, and a control valve is provided to control the amount of fluid bled off.

If the pressure exchanger is being operated as a shaft power producer, the valve is kept closed and the whole of the high-pressure fluid passes to the combustion chamber. However, if the pressure exchanger is being operated as a compressor, then the valve is kept open and only a sufficient quantity of the fluid is fed to the combustion chamber to provide energy for rotating the cell ring and compressing the air. No external power is delivered under these conditions.

This alternative embodiment may be applied advantageously to a vehicle in which shaft power is required for propulsion purposes and compressed air or gas is required when the vehicle is stationary. The invention can also be applied to a propeller driven aircraft, shaft power being employed during normal flight and compressed air being employed during landing for providing lift by means of blown flaps or similar devices. It is also envisaged that the invention could be applied to jet-flap propeller-driven aircraft, in which case the pressure exchanger would be required to fulfill a dual role during all flight conditions.

Figure 5:
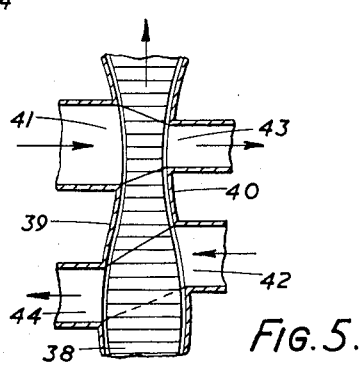
FIGURES 5, 6 and 7 are further developed views of pressure exchangers in accordance with the invention.

FIGURE 5 shows another pressure exchanger in accordance with the invention the cycle of which is particularly suitable for producing useful shaft power. The pressure exchanger has cells 38 of variable volume and end-plates 39, 40 at each end of the cells, in which end-plates there are ports 41, 42, 43 and 44 to lead fluid to and from the cells. In this embodiment, high-pressure fluid is led to the cells through the port 41, low-pressure fluid is led to the cells through the port 42, high-pressure fluid leaves the cells through the port 43 and low-pressure fluid leaves the cells through the port 44. It will be seen that the pressure exchanger just described differs from the one described with reference to FIGURE 4 only in the positioning and the relative widths of the high-pressure inlet and outlet ports. With the embodiment of FIGURE 5, it is possible to produce a relatively higher final pressure in the cells after the high-pressure scavenging stage for a given compression ratio and mach numbers in the high-pressure inlet and outlet ports than is possible with the cycle of the pressure exchanger of FIGURE 4, and therefore this cycle can produce a higher shaft power.

Figure 6:
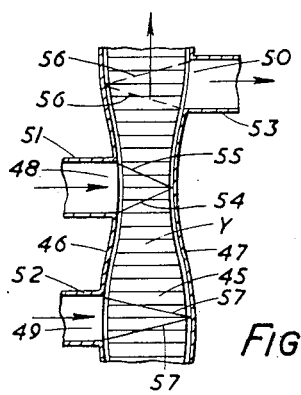

FIGURE 6 shows a further embodiment of a pressure exchanger in accordance with the invention incorporating cells of variable volume. The pressure exchanger has cells 45 of variable volume and end-plates 46, 47 at each end of the cells, in which end-plates there are ports 48, 49 and 50 to lead fluid to and from the cells. In this figure, high-pressure fluid is led to the cells through the high-pressure inlet port 48, low-pressure fluid is led to the cells through the low-pressure inlet port 49, and fluid at a pressure intermediate that of the aforementioned high and low pressure is led from the cells through the medium-pressure outlet port 50. Ducts corresponding to these ports are referenced 51, 52 and 53.

In operation, the cells of variable volume move continuously past the ports and the lands between the ports. Thus, the cycle for the purpose of description may be considered to start at any position. Assuming that the cycle starts at position Y, the fluid in the cell passing the position Y will be stationary relative to the cell and both ends of the cell will be closed by the end-plates 46, 47. This fluid is introduced to the cell in the manner to be described hereinafter. As this cell continues to rotate, the fluid in the cell is progressively compressed by the decreasing volume of the cells. As rotation of the cell ring continues, the left-hand end of the cell is opened to the high-pressure inlet port 48, which forms a termination of the inlet duct 51. Since the pressure in the cell is lower than the total pressure in the inlet duct 51, high-pressure fluid will flow through the port 48 into the cell. Consequently, a series of compression waves, indicated at 54, will pass through the cell, thus compressing the contents of the cell. A series of reflected compression waves indicated at 55 will pass through the cell as the cell continues to move past the high-pressure inlet port 48, thus further compressing the contents of the cell. As the cell ring continues to rotate, the cell is closed to the high-pressure inlet port 48, by the end-plate 46. The contents of the cell are then progressively expanded by the increasing volume of the cells until the right-hand side of the cell becomes open to the medium-pressure outlet port 50. Since the pressure of the fluid in the cell is higher than the total pressure at the outlet port, the fluid will leave the cell through the medium-pressure outlet duct 53. Consequently, a series of expansion waves, indicated at 56, will pass through the cell. As the cell ring continues to rotate, the cell becomes closed to the medium-pressure outlet port 50 and the contents are further expanded by the increasing volume of the cells, until the left-hand side of the cell becomes open to the low-pressure inlet port 49, through which, since the fluid in the cell is at a lower pressure than the total pressure in the inlet port, fluid will enter the cell and a series of compression waves indicated at 57 will be set up in the cell. As the cell ring continues to rotate, the cell becomes closed to the low-pressure inlet port, after which it reaches the position Y. The cycle of operation is then repeated.

The location of the medium-pressure outlet port is important, since the re-positioning of the port towards the high-pressure inlet port will reduce the shaft-power available, but will increase the pressure of the fluid passing through the medium-pressure port for a given set of conditions in the high- and low-pressure inlet ports. Re-positioning of the medium-pressure outlet port in the opposite sense will have the converse effect.

Figure 7:
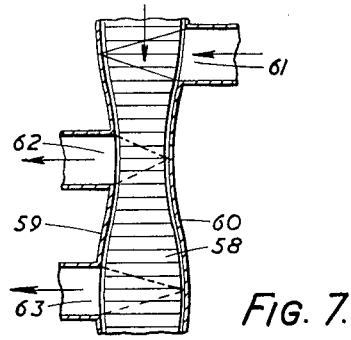

FIGURE 7 shows a still further embodiment of a pressure exchanger including cells of variable volume. The pressure exchanger has cells of variable volume 58, end-plates 59, 60 at each end of the cells, in which end-plates there are ports 61, 62 and 63 to lead fluid to and from the cells. In this embodiment, medium-pressure fluid is led to the cells through the port 61, high-pressure fluid leaves the cells through the port 62 and low-pressure fluid leaves the cells through the port 63. The operation of the cycle is substantially the same as that described with reference to FIGURE 6 apart from the reversal of fluid flow direction in the ducts. The location of the medium-pressure inlet port for a given set of conditions in the high- and low-pressure outlet ports is important in as much as re-positioning of the medium-pressure inlet port towards the high-pressure outlet port will have the effect of increasing the shaft-work available and will also increase the pressure of the fluid in the region of the medium-pressure inlet port. Re-positioning of the medium-pressure inlet port towards the low-pressure outlet port will have the converse effect.

Referring now to FIGURES 8 and 9 which diagrammatically illustrate a pressure exchanger in accordance with the invention which is particularly suitable for producing a high shaft power. The cells at their position of minimum volume have substantially zero volume. The pressure exchanger includes a cell ring having a multiplicity of radial walls 64 arranged around a cell rotor 65 which has an axis of rotation 66. A stationary cylindrical shroud 67 having an axis 68 circumferentially surrounds the radial cell walls 64. The cells defined by the walls 64, the cell rotor 65 and the cylindrical shroud 66 are in themselves open-ended but the effective opening of the ends of the cells is controlled by end-plates 70, 71 having ports 72, 73, 74 and 75 to lead fluid to and from the cells. High-pressure fluid is admitted through the port 72, low-pressure fluid is admitted through the port 73, high-pressure fluid leaves through the port 74 and low-pressure fluid leaves through the port 75. Ducts corresponding to these ports are referenced 76, 77, 78 and 79 respectively. A sealing block 80 of meehanite (FIGURE 9), is mounted in a recess in the cylindrical shroud 67 and is in contact with the cell rotor 65 when the cells are at the position of minimum volume.

In operation, the cells of the cell ring move continuously past the ports and the lands between the ports. Thus, the cycle for the purpose of description may be considered to start at any position. Assuming that the cycle starts as a cell is moving past the position Z, the cell will be empty as it has just passed the position of zero volume. As the cell ring continues to rotate, the cell is opened to the high-pressure inlet port 72 in the end-plate 70. Since the stagnation pressure in the port 72 is considerably higher than the initial stagnation pressure within the cell, a series of strong compression waves indicated at 81, will pass through the cell. As the cell ring continues to rotate, the cell becomes closed to the port 72 by the end-plate 70. As rotation of the cell continues, the fluid in the cell is expanded owing to the increase in cell volume until, at the position of maximum volume, the cell becomes open to the low-pressure outlet port 75 in the end-plate 71. The stagnation pressure of the fluid in the duct 79 is lower than the initial stagnation pressure within the cell and, consequently, a series of expansion waves, indicated at 82, will pass through the cell as the fluid in the cell leaves through the port 75, and will create a low-pressure region at the end of the cell adjacent the end-plate 71. As the cell ring continues to rotate the cell becomes open to the low-pressure inlet port 73 in the end-plate 70. Owing to the creation of the low-pressure region in the cell by the expansion waves 82, fluid will pass into the cell through the port 73. The cell then becomes closed to the inlet port 73 and a series of expansion waves, indicated at 83, will pass through the cell. As rotation of the cell ring continues, the cell becomes closed to the low-pressure outlet port 75. The cell is then closed at each end by the end-plates 70 and 71 and the contents of the cell will be compressed by the decrease in cell volume until the cell becomes open to the high-pressure outlet port 74 through which the contents are expelled. As the cell reaches the position of zero volume it becomes closed to the outlet port 74, after which the cell reaches the position Z and the cycle of operation is continuously repeated.

It will be appreciated that this pressure exchanger cycle will have higher pressures in the expansion region than in the corresponding positions in the compression region. A nett gain in positive gas work is therefore obtained which may be used to provide drive for the cell ring and also provide a useful shaft power output.

FIGURE 10 shows a pressure exchanger similar to that illustrated in FIGURE 8 but which is particularly suitable for use as a supercharger. The pressure exchanger has cells 84 of variable volume and end-plates 85, 86 at each end of the cells, in which end-plates there are ports 87, 88, 89, 90 to lead fluid to and from the cells. In this figure, high-pressure fluid is led to the cells through the port 87, low-pressure fluid is led to the cells through the port 88, high-pressure fluid is led from the cells through the port 89 and low-pressure fluid is led from the cells through the port 90. It will be seen that the pressure exchanger just described differs from the one described with reference to FIGURE 8 only in the positioning and the relative widths of the low-pressure inlet and outlet ports which are positioned to communicate with the cells just before the cells reach their position of maximum volume 91.

Referring now to FIGURES 11 and 12 which diagrammatically illustrate a pressure exchanger in accordance with the invention in which the variation in volume of the cells between a position of maximum volume and a position of minimum volume occurs twice per unit of relative motion, whereby at least two cycles of operation can be effected per unit of relative motion. The pressure exchanger includes a cell ring having a multiplicity of radial walls 95 arranged around an inner member in the form of a cell rotor 96 which has an axis of rotation 97. An outer tubular stationary shroud member 98 of elliptical form circumferentially surrounds the radial cell walls 95. The axis of rotation of the cell ring may pass through or be off-set from the major axis of the elliptical shroud. However, it will be appreciated that in each case the cell ring and the elliptical shroud will be eccentric one with respect to the other since an ellipse has no definable centre and, hence, the shroud obviously cannot have the same centre as that of the cell rotor. As described in the aforementioned embodiments, slots are formed in the hub in which the walls 95 are slidable and in which springs serve to bias the walls outwardly. The outer edges of the cell walls 95 are therefore in rubbing contact with the inner surface of the shroud 98 during operation of the pressure exchanger. Cells 100 defined by the walls 95, the cell rotor 96 and the shroud 98 are in themselves open-ended but the effective opening of the ends of the cells is controlled by end-plates 101, 102 one at each end of the cell. The end-plate 101 has ports 103, 104, 105, 106 for the admission of fluid to the cells and the end-plate 102 has ports 107, 108 for the extraction of fluid from the cells. Low-pressure fluid is led to the cells through the port 103, higher-pressure fluid is led to the cells through the port 104, and fluid at a pressure intermediate the low and higher-pressures is led from the cells through the port 107. Low-pressure fluid is led to the cells through the port 105, higher-pressure fluid is led to the cells through the port 106 and fluid at a pressure intermediate the low and higher-pressures is led from the cells through the port 108.

The operation of the pressure exchanger just described is substantially the same as that described with reference to FIGURE 6 excepting that the variation in volume of the cells between the positions of maximum and minimum volume occurs twice per unit of rotation of the cell ring thereby permitting two cycles of operation to be effected per unit of rotation as opposed to the one cycle per unit of rotation described with reference to FIGURE 6.

It will be seen that the two sets of three ports each, 103, 104, 107 and 105, 106, 108 are, in the actual machine, disposed respectively diametrically opposite one another. This arrangement ensures smooth and balanced operation. Whilst the full advantage would not be attained, some benefit would result if the pressure levels in the two sets of ports differed to some extent.

It is to be appreciated that although this embodiment has been described in accordance with a pressure exchanger in which there are two inlets and one outlet for each set of ports, the invention can be equally well applied to other variable volume cell pressure exchangers as hereinbefore described.

The ideal thermal efficiency of any one of the shaft power cycles described herein is the same as the ideal efficiency of an orthodox constant volume cycle internal-combustion engine having the same volumetric compression ratio, provided that the pressure exchanger volumetric compression and expansion ratios are equal. Compared with an orthodox constant volume cycle internal-combustion engine, a variable volume cell pressure exchanger shaft power cycle has an important thermodynamic advantage. Control of the pressure exchanger cycle is facilitated by controlling the quantity of fuel admitted to a combustion chamber disposed between the high-pressure outlet and inlet ports, i.e. control by variation mixture strength. Control of the pressure exchanger unit by mixture strength variation enables a limit to be imposed on the maximum cycle temperature, and this will alleviate some of the problems of internal cooling.

FIGURE 13 shows a pressure exchanger having hydrodynamic means for varying the volume of the cells. The pressure exchanger includes a cell ring having a multiplicity of unshrouded radial walls 110 arranged around a cell rotor 111, the cell ring having an exis of rotation 112. A cylindrical shroud 113 having an axis of rotation 114 is mounted to circumferentially surround the cell ring. A radially inwardly extending flange 115 is carried at each axial end of the shroud 113. A plurality of radial vanes 116 are secured to the inner surface of the shroud 113 and extend over the whole axial length of the shroud. The vanes 116 have a radial depth equal to the radial depth of the flanges 115. Each cell wall 110 projects radially outwardly from the cell rotor of the pressure exchanger to a position between adjacent vanes 116. Stationary structure of the pressure exchanger includes an outer casing 117 circumferentially surrounding the shroud 113 and end-plates (not shown) secured to the outer casing 117 at each end of the cell ring. Ports are located in the end-plates to lead fluid to and from the cells of the pressure exchanger in a conventional manner.

On rotation of the cell ring, an incompressible fluid, for example water containing a corrosion inhibitor is introduced into the spaces between the shroud 113, the radial vanes 116 and the flanges 115. The water is retained in this position by the centrifugal effect of the rotating cell ring and the shroud 113. The tips of the cell walls 110 run immersed in the water. As can be seen from the figure, on rotation of the cell ring, the cells will vary in volume owing to the eccentricity of the axes of the cell ring and the shroud 113. The speed of rotation of the cell ring should be equal to or approximately equal to the speed of rotation of the rotatable shroud.

It is to be understood that in this embodiment the outer tubular member is constituted by the shroud 113 and the incompressible fluid.

The shroud 113 may be driven by an electric motor through gearing (not shown). Alternatively, the cell walls 110 may be arranged to act directly on the vanes 116, thereby driving the outer shroud 113. If the latter arrangement is used the shroud and rotor simulate an internal gear and pinion drive, lubricated by the incompressible fluid introduced into the spaces between the shroud 113, the radial vanes 116 and the flanges 115.

The radial vanes 116 are provided to prevent any circumferential flow of the water to and from adjacent cells instantaneously at different pressures. The effect on the water of a difference in pressure between adjacent cells is illustrated in FIGURE 13A. The water trapped between the tips of the cell walls 110 and the radial vanes 116 is indicated by broken lines and illustrates the difference in levels of water in adjacent cells of the pressure exchanger.

By providing a steady flow of water to and from the pressure exchanger, a proportion of the fluid may be permitted to spill on to the end-plates, thereby serving as a coolant. Alternatively, sufficient cooling may be obtained simply by evaporation of the water.

FIGURE 14 shows an alternative means for varying the volume of the cells of a pressure exchanger. The pressure exchanger includes a cell ring having a multiplicity of radial walls 118 arranged around an inner member in the form of a cell rotor 119 and having an outer cylindrical rotatable shroud member 120. The cells defined by the walls 118, the cell rotor 119 and the shroud 120 are in themselves open-ended but the effective opening and closing of the ends of the cells is controlled by an end-plate (not shown) at each end of the cell ring having ports to lead fluid to and from the cells. The cell walls 118 are radially slidable in grooves 121 formed in the cell rotor 119 and are forced against the cylindrical shroud 120 by springs 122 acting on the radially inner end of the cell walls 118. The cell ring rotates about an axis 123, and the cylindrical shroud 120 rotates about an axis 124, the speeds of rotation of the cell ring and the cylindrical shroud should be equal to or approximately equal to one another. The cylindrical shroud 120 is supported on four rollers 126 running in recesses formed in a stationary casing 125. Alternatively, the rollers may be mounted in a loose cage, the rollers then functioning as the rollers of a roller race, the outer track being formed in the stationary casing 125 and the inner track being formed in the outer surface of the rotatable cylindrical shroud 120.

As can be seen from the figure, in operation of the pressure exchanger, the cells will vary in volume owing to the eccentricity of the axes of the cell ring and the cylindrical shroud as described with reference to FIGURE 3 of the drawings.

Referring now to FIGURE 15, the sliding vane pressure exchanger includes a cell ring having a plurality of radial vanes 130 arranged around a cell rotor 131 mounted for rotation on a shaft 132 and having a stationary cylindrical shroud 133. Cells defined by the vanes 130, the cell rotor 131 and the shroud 133 are in themselves open-ended and the effective opening and closing of the cells is controlled by stationary end-plates 134, 135 one at each end of the cell ring. The end-plate 134 has ports 136, 137 for the admission of fluid to the cells and the end-plate 135 has ports 138, 139 for the extraction of fluid from the cells. The vanes 130 are radially slidable in grooves (as shown in FIGURE 14) formed in the cell rotor 131 and each vane has lugs 130A one at each side of the vane. The lugs 130A extend beyond the axial extent of the cell rotor and track in guide-ways 140, one formed in each end-plate 134, 135. The cell rotor has an axis of rotation 141 and each guide-way 140 has an axis 142. Annular seals 148 are provided to prevent any leakage of fluid between the ports and the clearance spaces between the cell rotor and the end-plates.

In operation, the cells of the sliding vane pressure exchanger vary in volume owing to the eccentricity of the axes of the cell rotor 131 and the guide-ways 140. The axis of the guide-ways 140 is substantially the same as that of the shroud 133, thereby permitting a predetermined clearance to be maintained between the radially outer ends of the vanes 130 and shroud 133, and the eccentricity of these axes relative to the axis of rotation of the cell rotor 131 causes cyclic variation in the volume of the cells of the sliding vane pressure exchanger.

The lugs 130A which track in the guide-ways 140 may be of any form, such as rectangular or circular, which, during operation of the sliding vane machine, cause radial movement of the vanes 130 in the grooves formed in the cell rotor 131.

Referring now to FIGURE 16, the sliding vane pressure exchanger includes a cell ring having a plurality of vanes 145 arranged around a cell rotor 146 and having a stationary cylindrical shroud 147. Cells defined by the vanes 145, the cell rotor 146 and the shroud 147 are in themselves open-ended but the effective opening and closing of the cells is controlled by stationary end-plates 148 and 149, one at each end of the cell ring. The end-plate 148 has a port 150 for the admission of low-pressure fluid to the cells and a port 151 for the admission of higher-pressure fluid to the cells and the end-plate 149 has a port 152 for the extraction of low-pressure fluid from the cells and a port 153 for the extraction of higher-pressure fluid from the cells. The vanes 145 are radially slidable in grooves formed in the cell rotor and are urged against the shroud 147 by springs (as shown in FIGURE 14) acting on the radially inner ends of the vanes 145. The cell ring has an axis of rotation 156 and the shroud 147 has a longitudinal axis 157. Strengthening caps 158, 159 each having an annular flange 160, 161 are mounted one at each end of the cell rotor 146 with the flanges 160, 161 engaging respectively extensions 162, 163 formed on the cell rotor. The caps 158, 159 are secured to the cell rotor by a ring of fixing bolts 164 which pass through bores in each cap and through aligned axially extending passages 165 in the cell rotor 146. The caps 158, 159 include extensions 166, 167 having passages 168, 169 therethrough which communicate with grooves 170, 171 formed in each cap, which grooves communicate with the passages 165. Annular seals 172, 173 are provided between each flange 160, 161 and its adjacent end-plate to prevent any leakage of fluid from the cells between the caps 158, 159 and the end-plates 148, 149. Bearings 174, 175 are provided between the extensions 166, 167 and the end-plates 148, 149 respectively.

In operation, the cells of the sliding vane pressure exchanger vary in volume owing to the eccentricity of the axes of the cell ring and the shroud 147 as described in accordance with FIGURE 14.

The strengthening caps 158, 159 prevent any tendency for the sector-shaped pieces of the cell rotor defined between adjacent grooves 154 from breaking away during operation of the pressure exchanger owing to centrifugal load, and any tendency of the sector-shaped pieces to rock.

A cooling fluid is led to the passage 168 and is given an initial momentum as it passes through the grooves 170 by centrifugal force. Owing to the difference in radii at the inlet to the passage 168 and at the outlet from the passage 169, a pressure drop will exist across the passages 165, thereby facilitating a steady flow of cooling fluid through the passages. Fluid is extracted from the passages 165 through the grooves 171 and passage 169.

A power input shaft may be coupled to the extension 166 and a power output shaft may be coupled to the extension 167. Alternatively, the pressure exchanger is made self-driving.

In an alternative embodiment, the cell rotor 146 is mounted for rotation on a shaft passing through bores in each end-plate and each strengthening cap. In this embodiment, cooling fluid is led to the grooves 170 through passages in the end-plate 148 and fluid is extracted from the grooves 171 through passages in the end-plate 149.

The strengthening caps may be secured to the cell rotor 146 by any other suitable means, for example they may be screwed onto the extensions of the cell rotor.

I claim:

1. A pressure exchanger including a cell rotor, a plurality of substantially radially disposed movable walls arranged around the periphery of the cell rotor and defining a plurality of open-ended cells, wherein one fluid quantity expands so compressing another fluid quantity with which it is in direct contact, end-plate structure effective to close the ends of the cells but having ports including at least one port operative to convey fluid at a high-pressure and at least one port operative to convey fluid at a low-pressure, structure circumferentially surrounding the cell rotor, and means for effecting relative movement between said walls and said cell rotor to vary, on rotation of the cell rotor, the volume of the cells from a position of minimum volume adjacent one of the said ports operative to convey fluid at a high-pressure, to a position of maximum volume adjacent one of the said ports operative to convey fluid at a low-pressure.

2. A pressure exchanger including a cell rotor, a plurality of substantially radially disposed movable walls arranged around the periphery of the cell rotor and defining a plurality of open-ended cells, wherein one fluid quantity expands so compressing another fluid quantity with which it is in direct contact, end-plate structure effective to close the ends of the cells but having ports including at least one port operative to convey fluid at a high-pressure and at least one port operative to convey fluid at a low-pressure, structure circumferentially surrounding the cell rotor, and means for effecting relative movement between said walls and said cell rotor to vary, on rotation of the cell rotor, the volume of the cells from a position of zero volume adjacent one of the said ports operative to convey fluid at a high-pressure, to a position of maximum volume adjacent one of the said ports operative to convey fluid at a low-pressure.

3. A pressure exchanger including a cell rotor, a plurality of substantially radially disposed movable walls arranged around the periphery of the cell rotor and defining a plurality of open-ended cells, wherein one fluid quantity expands so compressing another fluid quantity with which it is in direct contact, end-plate structure effective to close the ends of the cells but having ports including at least one port operative to convey fluid at a high-pressure and at least one port operative to convey fluid at a low-pressure, a rotatable shroud circumferentially surrounding the cell rotor, and means for effecting relative movement between said walls and said cell rotor to vary, on rotation of the cell rotor, the volume of the cells from a position of minimum volume adjacent one of the said ports operative to convey fluid at a high-pressure, to a position of maximum volume adjacent one of the said ports operative to convey fluid at a low-pressure.

4. A pressure exchanger including a cell rotor, a plurality of walls arranged around the cell rotor and defining a plurality of open-ended cells, wherein one fluid quantity expands so compressing another fluid quantity with which it is in direct contact, end-plate structure effective to close the ends of the cells but having ports including at least one port operative to convey fluid at a high-pressure and at least one port operative to convey fluid at a low-pressure, a rotatable shroud having an inner surface and an outer surface, which shroud is mounted to circumferentially surround the cell rotor and has an axis of rotation eccentric to the axis of rotation of the cell rotor, a flange at each end of the shroud extending radially inwardly from the inner surface of the shroud, a plurality of radial vanes secured to the radially inner surface of the shroud, each vane extending over the whole axial length of the shroud and having a radial depth substantially equal to the radial depths of the flanges, each cell wall extending radially outwardly from the cell rotor of the pressure exchanger to a position between adjacent vanes, means to effect relative rotation between the cells and the end-plate structure, and means to introduce an incompressible fluid into the spaces defined by the shroud, the radial vanes and the flanges on relative rotation between the cells and the end-plate structure.

5. A pressure exchanger including a cell rotor, a plurality of walls arranged around the rotor and defining a plurality of open-ended cells, wherein one fluid quantity expands so compressing another fluid quantity with which it is in direct contact, end-plate structure effective to close the ends of the cells but having ports including at least one port operative to convey fluid at a high-pressure and at least one port operative to convey fluid at a low-pressure, a rotatable shroud mounted to circumferentially surround the cell rotor and having an axis of rotation eccentric to the axis of rotation of the cell rotor, a plurality of inwardly extending grooves formed in the cell rotor and extending along the whole axial length of the cell rotor and means to effect relative rotation between the cell rotor and the end-plate structure, each cell wall being arranged so as to slide within the grooves upon relative rotation between the cell rotor and the end-plate structure.

6. A pressure exchanger including a cell rotor, a plurality of walls arranged around the cell rotor and defining a plurality of open-ended cells, wherein one fluid quantity expands so compressing another fluid quantity with which it is in direct contact, end-plate structure effective to close the ends of the cells but having ports therein for the admission of fluid to and the extraction of fluid from the cells, a shroud of elliptical cross-section mounted to circumferentially surround the cell rotor, the cell rotor having an axis of rotation which passes through the major axis of the elliptical shroud, a plurality of inwardly extending grooves formed in the cell rotor, each groove extending over the whole axial length of the cell rotor, and means to effect relative rotation between the cell rotor and the end-plate structure, each cell wall being arranged so as to slide within the grooves upon relative rotation between the cell rotor and the end-plate structure, whereby, on rotation of the cell rotor, the volume of the cells is varied from a position of minimum volume to a position of maximum volume at least twice per unit of relative rotation between the cell rotor and the end-plate structure.

7. A pressure exchanger including a cell rotor, a plurality of walls arranged around the cell rotor and defining a plurality of open-ended cells, wherein one fluid quantity expands so compressing another fluid quantity with which it is in direct contact, end-plate structure effective to close the ends of the cells but having ports therein for the admission of fluid to and the extraction of fluid from the cells, a shroud of elliptical cross-section mounted to circumferentially around the cell rotor, the cell rotor having an axis of rotation which is off-set from the major axis of the elliptical shroud, a plurality of inwardly extending grooves formed in the cell rotor, each groove extending over the whole axial length of the cell rotor, and means to effect relative rotation between the cell rotor and the end-plate structure, each cell wall being arranged so as to slide within the grooves upon relative rotation between the cell rotor and the end-plate structure, whereby, on rotation of the cell rotor, the volume of the cells is varied from a position of minimum volume to a position of maximum volume at least twice per unit of relative rotation between the cell rotor and the end-plate structure.

8. A pressure exchanger including a cell rotor, a plurality of walls arranged around the cell rotor and defining a plurality of open-ended cells, wherein one fluid quantity expands so compressing another fluid quantity with which it is in direct contact, end-plates one at each end of the cells effective to close the ends of the cells but having ports therein for the admission of fluid to and the extraction of fluid from the cells, a guideway formed in each end-plate, the axis of the guideways being parallel to but offset from the axis of rotation of the cell rotor, a lug formed at each end of each cell wall, which lugs track in the guideways formed in the end-plates, a plurality of inwardly extending grooves formed in the cell rotor, each groove extending over the whole axial length of the cell rotor, and means to effect rotation of the cell rotor relative to the end-plates, each cell wall being arranged so as to slide within the grooves upon rotation between the cell rotor and the end-plates owing to the lugs tracking the guideways in the end-plates.

9. A pressure exchanger including a cell rotor, a plurality of walls arranged around the cell rotor and defining a plurality of open-ended cells, wherein one fluid quantity expands so compressing another fluid quantity with which it is in direct contact, end-plate structure effective to close the ends of the cells but having ports for the admission of fluid to and the extraction of fluid from the cells, a shroud mounted to circumferentially surround the cell rotor and having a longitudinal axis eccentric to the axis of rotation of the cell rotor, a plurality of inwardly extending grooves formed in the cell rotor, each groove extending over the whole axial length of the cell rotor, an end-cap mounted on each end of the cell rotor and means to effect relative rotation between the cell rotor and the end-plate structure, each cell wall being arranged so as to slide within the grooves upon rotation between the cell rotor and the end-plate structure.

10. A pressure exchanger including:
  (a) an outer tubular member having an internal circumferential surface,
  (b) an inner member having an external circumferential surface mounted within the tubular member,
  (c) a plurality of walls extending from the circumferential surface of at least one of said members to positions adjacent the circumferential surface of the other of said members to define therebetween a plurality of open-ended cells wherein one fluid quantity expands so compressing another fluid quantity with which it is in direct contact,
  (d) one of the members being constructed to permit the walls to slide therein,
  (e) end-plate structure effective to close the ends of the cells but having ports therein, including a port to convey fluid at a high-pressure and a port to convey fluid at a lower-pressure,
  (f) means to provide for relative rotation between at least one of the members and the end-plate structure,
  (g) the outer tubular member and the inner member being eccentric one with respect to the other the arrangement being such that the distance between the circumferential surfaces is a minimum adjacent the port to convey fluid at a high-pressure and is a maximum adjacent the port to convey fluid at a lower-pressure, the walls sliding inwardly and outwardly in the member constructed for the purpose as the distance between the circumferential surfaces varies between a minimum and a maximum.

11. A pressure exchanger including:
(a) an outer tubular member having an internal circumferential surface,
(b) an inner member having an external circumferential surface mounted within the tubular member,
(c) a plurality of walls extending from the circumferential surface of at least one of said members to positions adjacent the circumferential surface of the other of said members to define therebetween a plurality of open-ended cells wherein one fluid quantity expands so compressing another fluid quantity with which it is in direct contact,
(d) one of the members being constructed to permit the walls to slide therein,
(e) end-plate structure effective to close the ends of the cells but having ports therein, including a port to convey fluid at a high-pressure and a port to convey fluid at a lower-pressure,
(f) means to provide for relative rotation between at least one of the members and the end-plate structure,
(g) the outer tubular member and the inner member being eccentric one with respect to the other the arrangement being such that the distance between the circumferential surfaces is zero adjacent the port to convey fluid at a high-pressure and is a maximum adjacent the port to convey fluid at a lower-pressure, the walls sliding inwardly and outwardly in the member constructed for the purpose as the distance between the circumferential surfaces varies between a minimum and a maximum.

12. A pressure exchanger including:
(a) an outer shroud having an internal circumferential surface,
(b) a cell rotor having an external circumferential surface mounted within the outer shroud,
(c) a plurality of walls extending from the circumferential surface of the cell rotor to positions adjacent the circumferential surface of the outer shroud to define therebetween a plurality of open-ended cells wherein one fluid quantity expands so compressing another fluid quantity with which it is in direct contact,
(d) the cell rotor being constructed to permit the walls to slide therein,
(e) end-plate structure effective to close the ends of the cells but having ports therein, including a port to convey fluid at a high-pressure and a port to convey fluid at a lower-pressure,
(f) means to provide for relative rotation between the cell rotor and the end-plate structure,
(g) the outer shroud and the cell rotor being eccentric one with respect to the other the arrangement being such that the distance between the circumferential surfaces is a minimum adjacent the port to convey fluid at a high-pressure and is a maximum adjacent the port to convey fluid at a lower-pressure, the walls sliding inwardly and outwardly in the cell rotor as the distance between the circumferential surfaces varies between a minimum and a maximum.

13. A pressure exchanger including:
(a) a rotatable shroud having an internal circumferential surface,
(b) a cell rotor having an external circumferential surface mounted within the rotatable shroud,
(c) a plurality of walls extending from the circumferential surface of the cell rotor into the rotatable shroud to define therebetween a plurality of open-ended cells wherein one fluid quantity expands so compressing another fluid quantity with which it is in direct contact,
(d) the rotatable shroud being constructed to permit the walls to slide therein,
(e) end-plate structure effective to close the ends of the cells but having ports therein, including a port to convey fluid at a high-pressure and a port to convey fluid at a lower-pressure,
(f) means to provide for relative rotation between the cell rotor and the end-plate structure,
(g) the rotatable shroud and the cell rotor being eccentric one with respect to the other the arrangement being such that the distance between the circumferential surfaces is a minimum adjacent the port to convey fluid at a high-pressure and is a maximum adjacent the port to convey fluid at a lower-pressure, the walls sliding inwardly and outwardly in the rotatable shroud as the distance between the circumferential surfaces varies between a minimum and a maximum.

14. A pressure exchanger including:
(a) an outer shroud having an internal circumferential surface,
(b) a cell rotor having an external circumferential surface mounted within the outer shroud,
(c) a plurality of inwardly extending grooves formed in the cell rotor, each groove extending over the whole axial length of the cell rotor,
(d) a plurality of walls extending from the said grooves and towards the circumferential surface of the outer shroud to define therebetween a plurality of open-ended cells wherein one fluid quantity expands so compressing another fluid quantity with which it is in direct contact,
(e) end-plate structure effective to close the ends of the cells but having ports therein including a port to convey fluid at a high-pressure and a port to convey fluid at a lower-pressure,
(f) means to provide relative rotation between the cell rotor and the end-plate structure,
(g) the outer shroud and the cell rotor being eccentric one with respect to the other the arrangement being such that each cell wall is arranged to slide within said grooves upon relative rotation between the cell rotor and the end-plate structure.

15. A pressure exchanger, wherein one fluid quantity expands so compressing another fluid quantity with which it is in direct contact, including:
(a) an outer tubular member having an internal circumferential surface,
(b) an inner member having an external circumferential surface mounted within the tubular member,
(c) a plurality of walls extending from the circumferential surface of at least one of said members to positions adjacent the circumferential surface of the other of said members to define therebetween a plurality of open-ended cells,
(d) one of the members being constructed to permit the walls to slide therein,
(e) end-plate structure effective to close the ends of the cells but having ports therein including a port for the admission of fluid at a high-pressure to the cells, a port for the admission of fluid at a lower-pressure to the cells and at least one port for the extraction of fluid from the cells at a pressure intermediate the aforementioned high and lower-pressures,
(f) means to provide for relative rotation between at least one of the members and the end-plate structure,
(g) the outer tubular member and the inner member being eccentric one with respect to the other the arrangement being such that the distance between the circumferential surfaces is a minimum adjacent the port to convey fluid at a high-pressure and is a maximum adjacent the port to convey fluid at a lower-pressure, the walls sliding inwardly and outwardly in the member constructed for the purpose as the dis- 16. A pressure exchanger, wherein one fluid quantity expands so compressing another fluid quantity with which it is in direct contact, including:
(a) an outer tubular member having an internal circumferential surface,
(b) an inner member having an external circumferential surface mounted within the tubular member,
(c) a plurality of walls extending from the circumferential surface of at least one of said members to positions adjacent the circumferential surface of the other of said members to define therebetween a plurality of open-ended cells,
(d) one of the members being constructed to permit the walls to slide therein,
(e) end-plate structure effective to close the ends of the cells but having ports therein, including a port for the extraction of fluid at a high-pressure from the cells, a port for the extraction of fluid at a lower-pressure from the cells and a port for the admission of fluid to the cells at a pressure intermediate the aforementioned high and lower-pressures,
(f) means to provide for relative rotation between at least one of the members and the end-plate structure,
(g) the outer tubular member and the inner member being eccentric one with respect to the other the arrangement being such that the distance between the circumferential surfaces is a minimum adjacent the port to convey fluid at a high-pressure and is a maximum adjacent the port to convey fluid at a lower-pressure, the walls sliding inwardly and outwardly in the member constructed for the purpose as the distance between the circumferential surfaces varies between a minimum and a maximum.

17. A pressure exchanger, wherein one fluid quantity expands so compressing another fluid quantity with which it is in direct contact, including:
(a) an outer shroud having an internal circumferential surface,
(b) a cell rotor having an external circumferential surface mounted within the outer shroud,
(c) a plurality of walls extending from the circumferential surface of the cell rotor to positions adjacent the circumferential surface of the outer shroud to define therebetween a plurality of open-ended cells,
(d) the cell rotor being constructed to permit the walls to slide therein,
(e) end-plate structure effective to close the ends of the cells but having ports therein, including ports to convey fluid at a high-pressure and ports to convey fluid at a lower-pressure,
(f) means to provide for relative rotation between the cell rotor and the end-plate structure,
(g) the outer shroud and the cell rotor being eccentric one with respect to the other the arrangement being such that the distance between the circumferential surfaces varies from a minimum adjacent a port to convey fluid at a high-pressure to a maximum adjacent a port to convey fluid at a lower-pressure, the walls sliding inwardly and outwardly in the cell rotor as the distance between the circumferential surfaces varies between a minimum and a maximum, which variation occurs at least twice per unit of relative rotation between the cell rotor and the end-plate structure.

References Cited by the Examiner

UNITED STATES PATENTS

| 2,045,152 | 6/36 | Lebre. | |
| 2,633,292 | 3/53 | Voznica | 230—152 |
| 2,658,456 | 11/53 | Wahlmark | 103—136 |
| 2,675,173 | 4/54 | Jendrassik | 230—69 |

FOREIGN PATENTS 290,669　5/28　Great Britain.

DONLEY J. STOCKING, *Primary Examiner.*

WARREN E. COLEMAN, LAURENCE V. EFNER, *Examiners.*